United States Patent
Tanaka et al.

(10) Patent No.: US 9,841,005 B2
(45) Date of Patent: Dec. 12, 2017

(54) WIND POWER GENERATION SYSTEM AND WIND POWER GENERATION METHOD

(71) Applicant: KABUSHIKI KAISHA TOSHIBA, Minato-ku (JP)

(72) Inventors: Motofumi Tanaka, Yokohama (JP); Naohiko Shimura, Atsugi (JP); Toshiki Osako, Kawasaki (JP); Toshimasa Yamada, Yokohama (JP); Hisashi Matsuda, Shinagawa (JP); Yuuta Onishi, Fuchu (JP); Shinya Nakayama, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/712,151

(22) Filed: May 14, 2015

(65) Prior Publication Data
US 2015/0345466 A1    Dec. 3, 2015

(30) Foreign Application Priority Data

May 29, 2014   (JP) .................................. 2014-111426
Jan. 14, 2015   (JP) .................................. 2015-004715

(51) Int. Cl.
*F03D 7/02*   (2006.01)
*F03D 7/04*   (2006.01)
*F03D 9/25*   (2016.01)

(52) U.S. Cl.
CPC ............. *F03D 7/022* (2013.01); *F03D 7/042* (2013.01); *F03D 7/043* (2013.01); *F03D 9/25* (2016.05);

(Continued)

(58) Field of Classification Search
CPC ................. Y02E 10/723; Y02E 10/725; H02P 2009/004; H02P 9/24; H02P 9/18; C06D 5/04; F02K 9/68
See application file for complete search history.

(56) References Cited

U.S. PATENT DOCUMENTS 6,722,581 B2 *   4/2004   Saddoughi .............. B64C 23/06
                                                    239/102.1
7,305,823 B2 *  12/2007   Stewart ............... F03B 13/1845
                                                        290/42

(Continued)

FOREIGN PATENT DOCUMENTS

EP      2 520 800 A1    11/2012
JP      2006-197986 A    8/2006
JP      2008-25434 A     2/2008

OTHER PUBLICATIONS

Extended European Search Report dated Oct. 22, 2015 in Patent Application No. 15168514.6.

*Primary Examiner* — Tulsidas C Patel
*Assistant Examiner* — Charles Reid, Jr.
(74) *Attorney, Agent, or Firm* — Oblon, McClelland, Maier & Neustadt, L.L.P.

(57) ABSTRACT

A wind power generation system has a windmill, a lift improvement device, a power generator, a storage, and a controller. The windmill rotates when receiving an airflow. The lift improvement device has a capability of operating and halting, the lift improvement device increases a lift force to a blade of the windmill when operating. The power generator generates power by rotation of the windmill and a torque is generated in a direction suppressing rotation of the windmill. The storage stores a plurality of characteristic maps indicating characteristics of the torques of the power generator in relation to rotation speeds of the power generator. The controller controls a power generation amount of (Continued)

the power generator by switching and using the plurality of characteristic maps of the storage in correspondence with a state of operating or halting of the lift improvement device.

5 Claims, 5 Drawing Sheets

(52) U.S. Cl.
CPC . *F05B 2270/101* (2013.01); *F05B 2270/1032* (2013.01); *F05B 2270/327* (2013.01); *Y02E 10/721* (2013.01); *Y02E 10/723* (2013.01)

(56) References Cited

U.S. PATENT DOCUMENTS

| | | | |
|---|---|---|---|
| 7,585,275 B2 | 9/2009 | Kubota et al. | |
| 8,093,737 B2 * | 1/2012 | Wittekind | F03D 7/0276 290/44 |
| 8,502,403 B2 * | 8/2013 | Merswolke | F03D 9/002 290/44 |
| 2007/0261404 A1 * | 11/2007 | Stewart | F03B 13/1845 60/495 |
| 2009/0033098 A1 * | 2/2009 | Griffith | B63H 9/0685 290/55 |
| 2009/0212164 A1 * | 8/2009 | Osborne | B64C 23/005 244/205 |
| 2010/0038909 A1 * | 2/2010 | Andersen | F03D 7/0224 290/44 |
| 2010/0104436 A1 * | 4/2010 | Herr | F03D 1/06 416/31 |
| 2010/0123046 A1 * | 5/2010 | Khozikov | B64C 21/10 244/200.1 |
| 2011/0089693 A1 * | 4/2011 | Nasiri | F03D 7/0272 290/44 |
| 2011/0229322 A1 * | 9/2011 | Tadayon | F03D 1/065 416/91 |
| 2012/0068469 A1 * | 3/2012 | Behrens | F03D 1/0641 290/55 |
| 2012/0134813 A1 | 5/2012 | Nies et al. | |
| 2014/0042745 A1 * | 2/2014 | Perley | F03D 7/0272 290/44 |

* cited by examiner

WIND POWER GENERATION SYSTEM AND WIND POWER GENERATION METHOD

CROSS-REFERENCE TO RELATED APPLICATION

This application is based upon and claims the benefit of priority from the prior Japanese Patent Applications No. 2014-111426, filed on May 29, 2014 and No. 2015-004715, filed on Jan. 14, 2015; the entire contents of which are incorporated herein by reference.

FIELD

Embodiments described herein relate generally to a wind power generation system and a wind power generation method.

BACKGROUND

One of factors to hinder spread of wind power generation is geographical constraints, for example, in Japan.

One of the geographical constraints is that in Japan a wind velocity and a wind direction rapidly changes because of its mountain weather, and thus it is difficult to maintain a stable output of a wind power generation system.

The above factor deteriorates a power generation efficiency per windmill, resulting in an increase in introduction cost of the wind power generation system.

In addition to the above, in Japan, a land of which is small, problems to a locational environment come to appear as wind power generation spreads, and in a case where location near private houses or a community is inevitable, various troubles in relation to noise are apt to occur.

As a measure to stabilize the output or to solve a noise problem as above, there is disclosed a technique of providing a lift improvement device which controls an airflow by having an electrode mounted on a windmill blade to generate plasma, for example.

However, with regard to use of a lift improvement device as above, the lift improvement device is not necessarily required to be actuated in a good wind condition, and in a case where the lift improvement device is provided later, that is, added, to an existing windmill, the windmill being originally designed to be able to generate power at a maximum efficiency without the lift improvement device, the efficiency is not sometimes improved much even if the lift improvement device is added.

DETAILED DESCRIPTION

A wind power generation system of an embodiment has a windmill, a lift improvement device a power generator, a storage, and a controller. The windmill rotates when receiving an airflow. The lift improvement device has a capability of operating and halting and increases a lift force to a blade of the windmill when operating. The power generator generates power by rotation of the windmill and a torque is generated in a direction to suppress rotation of the windmill. The storage stores a plurality of characteristic maps indicating characteristics of the torques to be generated by the power generator in relation to rotation speeds of the power generator. The controller controls a power generation amount of the power generator by switching and using the plurality of characteristic maps of the storage in correspondence with a state of operation or halt of the lift improvement device.

A problem to be solved by an embodiment is to provide a wind power generation system and a wind power generation method capable of improving an efficiency and further maximizing the efficiency of a wind power generation system on which a lift improvement device is mounted.

Hereinafter, an embodiment will be described in detail with reference to the drawings.

Figure 1:
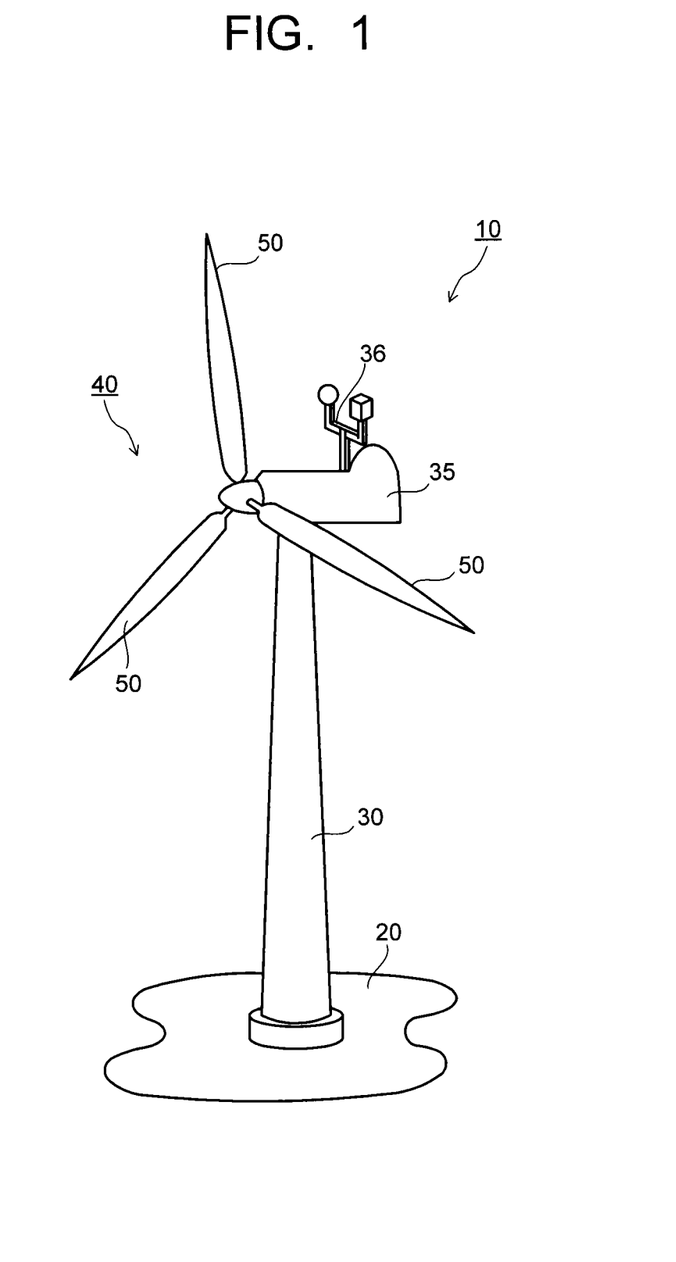
FIG. 1 is an external perspective view of a wind power generation system of an embodiment.
Figure 2:
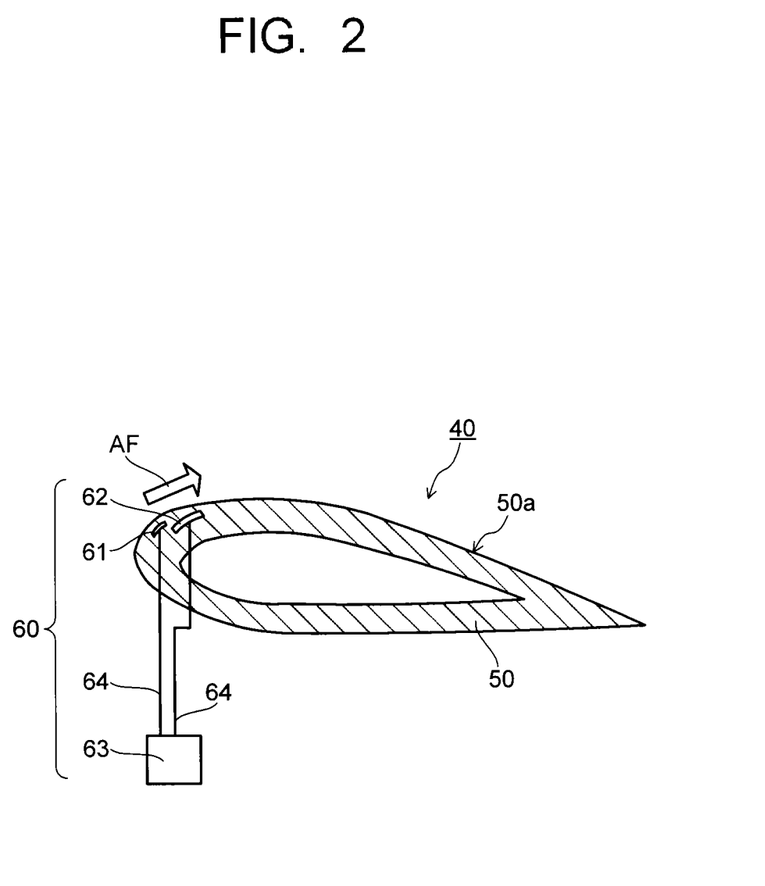
FIG. 2 is a view showing a configuration of an airflow generation device of the wind power generation system of FIG. 1

FIG. 1 is a view showing a configuration of a wind power generation system of an embodiment, while FIG. 2 is a view showing a configuration of an airflow generation device of the wind power generation system of FIG. 1.

As shown in FIG. 1, a wind power generation system 10 of this embodiment has a tower 30 installed on a ground 20, a nacelle 35 mounted on a top portion of the tower 30, an aerovane 36 mounted on an upper surface of the nacelle 35, a windmill blade 40 as a windmill which rotates when receiving wind from the front, and so on.

A power generator 150 (see FIG. 3) and so on are housed in the nacelle 35.

The power generator 150 is provided with a rotary shaft protruding from the nacelle 35, and the windmill blade 40 is supported by this rotary shaft.

In other words, the windmill blade 40 is supported by the rotary shaft of the power generator 150 which protrudes from the nacelle 35.

However, the above configuration is a configuration in a case where the windmill does not have a speed-increasing gear, and a in a case where a windmill has a speed-increasing gear, the windmill blade is supported by the speed-increasing gear.

Figure 3:
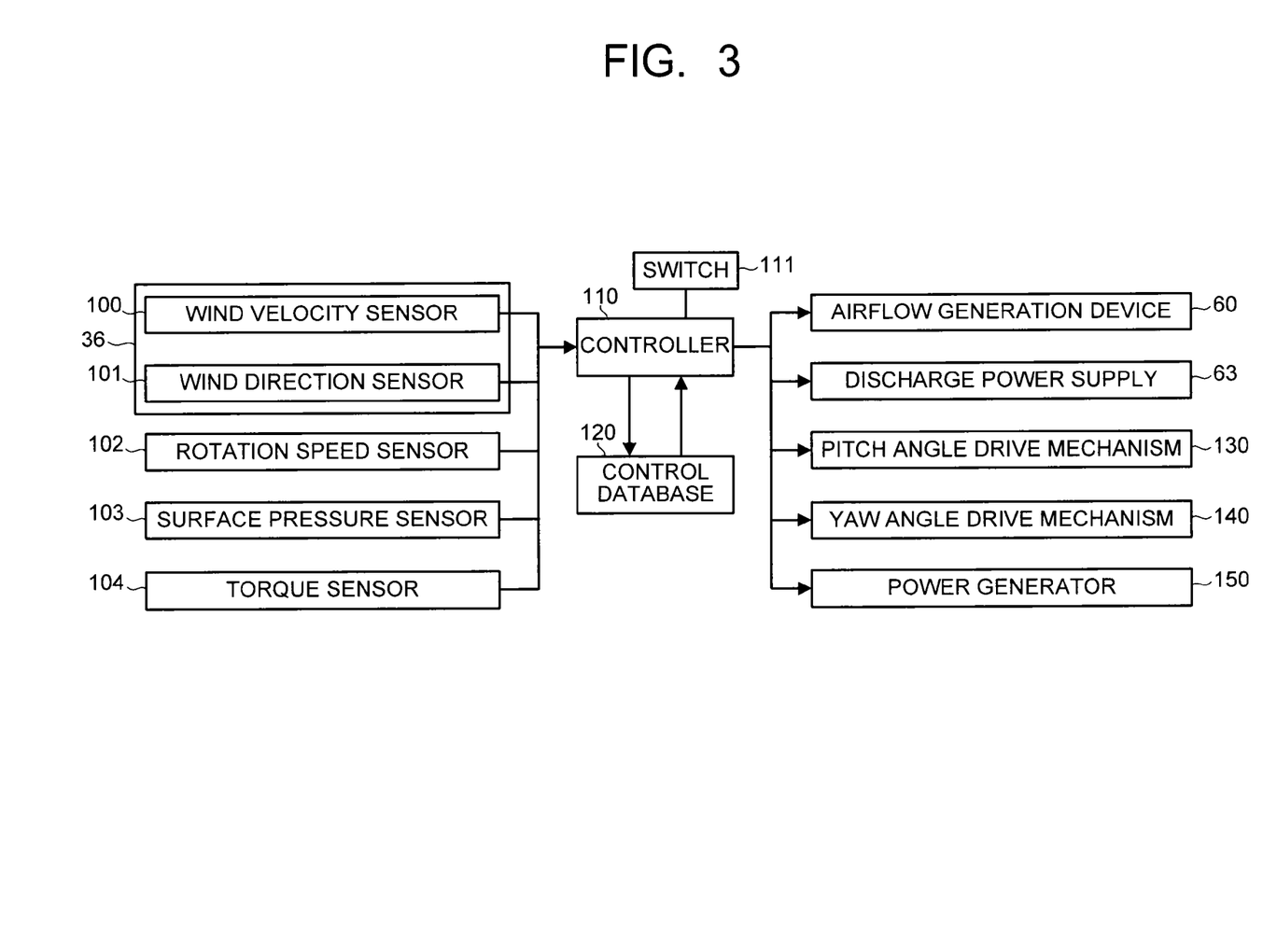
FIG. 3 is a diagram showing a configuration of a control system of the wind power generation system of the embodiment.

The aerovane 36 measures a wind direction and a velocity of wind and transmits each measured data to a controller 110 (see FIG. 3). The windmill blade 40 is supported in a freely rotatable manner. The windmill blade 40 rotates when receiving an airflow.

The windmill blade 40 is mainly constructed by three windmill blade main bodies 50 and an airflow generation device 60 provided in each windmill blade main body 50.

Though an example is described in which the windmill blade 40 is constituted with three blades in this example, the number of blades may be two, four, or five or more, and the number thereof is not limited.

The windmill blade main body 50 is constructed by a dielectric material having an external shape of the windmill blade main body 50.

As the dielectric material, for example, GFRP (glass fiber reinforced plastics) which is a glass fiber solidified by a synthetic resin can be cited, but the dielectric material is not limited thereto, and it suffices if a known dielectric material constructing a windmill blade main body is used.

Note that the entire windmill blade main body 50 does not need to be constructed by the dielectric material, but it suffices if at least a part in which an airflow generation device 60 is provided is constructed by the dielectric material.

In other words, it suffices if it is configured that electrodes of the airflow generation device 60 are not conducted with each other and that the electrode of the airflow generation device 60 and the windmill blade main body 50 are not conducted.

The airflow generation device 60 is set up to be able to be operated/halted by ON/OFF operation of a switch 111 by an operator, and functions as a lift improvement device to increase a lift force to the windmill blade main body 50 (windmill blade 40) by making the windmill blade main body 50 generate an airflow steadily or unsteadily when operating.

With regard to the switching operation of operating/halting of the airflow generation device 60, switching may be carried out when a measured value of a rotation speed of the power generator 150 reaches a predetermined rotation speed, or may be carried out not manually but automatically by timer control or detection by a wind power sensor.

The airflow generation device 60 is constituted with a first electrode 61, a second electrode 62 disposed apart from the first electrode 61, and a discharge power supply 63 to apply a voltage between the first electrode 61 and the second electrode 62 via a cable line 64.

The first electrode 61 is a plate electrode having a plate shape and is buried in the windmill blade main body 50.

Note that the first electrode 61 is provided in a manner that one main surface thereof is exposed on a surface so as to be contact with outside air, on a blade upper surface 50*a* of the windmill blade main body 50, that is, on a back side of the windmill blade main body 50.

Note that the first electrode 61 may be disposed in a manner to be exposed on a surface on a belly side of the windmill blade main body 50.

Further, a shape of the first electrode 61 is not limited to the plate shape but can be a bar shape with a cross section of circular shape, rectangular shape, or the like, for example.

The second electrode 62 is a plate electrode of plate shape, and is disposed apart from the first electrode 61 at a position deeper from the surface of the windmill blade main body 50 than the first electrode 61, a position displaced from the first electrode 61 in a direction where an airflow flows.

Note that in this case the second electrode 62 may be disposed at a position displaced from the first electrode 61 in an opposite direction to the direction where the airflow flows.

Further, when one main surface of the first electrode 61 is provided in a manner to be exposed on the same surface as the blade upper surface 50*a* of the windmill blade main body 50, the second electrode 62 may be disposed apart from the first electrode 61, in a manner that one main surface thereof is exposed on the same surface as the blade upper surface 50*a* of the windmill blade main body 50 and at a position displaced from the first electrode 61 in the direction where the airflow flows or in the opposite direction thereto.

Further, a shape of the second electrode 62 is not limited to the plate shape but can be a bar shape with a cross section of circular shape, rectangular shape, or the like, for example.

Note that the shape of the second electrode 62 may be the same as that of the first electrode 61.

The discharge power supply 63 functions as a voltage application mechanism and applies a voltage between the first electrode 61 and the second electrode 62.

The discharge power supply 63 outputs a voltage having a pulsed (positive, negative polarity, positive and negative bipolar (alternating voltage)) waveform or an alternating (sine, intermittent sine) waveform, for example.

Here, the windmill blade 40 is manufactured as follows, for example. When fabricating the windmill blade main body 50 by impregnating a resin into a stack of glass fibers by means of a manufacturing method such as preimpregnation and resin transferring, for example, metal foil bands or metal plates are stacked between the fibers to form a first electrode 61 and a second electrode 62 of an airflow generation device 60, and a windmill blade 40 is manufactured. Note that the manufacturing method of the windmill blade 40 is not limited to the above.

Here, a principle of generation of an airflow by the airflow generation device 60 will be described.

A voltage is applied between the first electrode 61 and the second electrode 62 from the discharge power supply 63, and when a potential difference becomes equal to or more than a predetermined threshold value, discharge is induced between the first electrode 61 and the second electrode 62.

This discharge is called corona discharge in a case where both electrodes are exposed on the blade upper surface 50*a* of the windmill blade main body 50, and is called barrier discharge in a case where at least one of the electrodes is buried in the windmill blade main body 50, and low-temperature plasma is produced.

In other words, the airflow generation device 60 generates an airflow by action of discharge plasma.

In the above discharge, since energy can be given only to an electron in gas, it is possible to produce an electron and an ion by ionizing the gas with little heating of the gas.

The produced electron and ion are driven by an electric field, and as a result that the electron and the ion collide with gas molecules, a kinetic momentum shifts to the gas molecules.

In other words, it is possible to generate an airflow AF in a neighborhood of the electrode by applying discharge.

Largeness and a direction of this airflow AF are controllable by changing a current-voltage characteristic such as a voltage to be applied to the electrode, a frequency, a current waveform, and a duty ratio.

Note that though the airflow generation device 60 is disposed to generate the airflow AF in a direction along a front edge to a rear edge of the blade upper surface 50*a* of the windmill blade main body 50, the direction of the airflow can be changed by a disposition method of the electrode.

Subsequently, a control system of the wind power generation system of this embodiment will be described with reference to FIG. 3.

The control system of the wind power generation system of this embodiment has, as shown in FIG. 3, the discharge power supply 63, a wind velocity sensor 100, a wind direction sensor 101, a rotation speed sensor 102, a surface pressure sensor 103, a torque sensor 104, the controller 110, the switch 111, a control database 120, the airflow generation device 60, a pitch angle drive mechanism 130, a yaw angle drive mechanism 140, and the power generator 150.

The power generator 150 generates power by rotation of the windmill blade main body 50 and generates a torque in a direction to suppress rotation of the windmill blade 40.

The wind velocity sensor 100 is a sensor which measures a velocity of wind flowing to the windmill blade 40.

The wind direction sensor 101 is a sensor which measures a wind direction of wind flowing to the windmill blade 40.

These wind velocity sensor 100 and wind direction sensor 101 are constituted with the aerovane 36 or the like provided on an upper side surface of the nacelle 35 shown in FIG. 1, for example.

The rotation speed sensor 102 is a sensor which measures a rotation speed of the windmill blade 40 and is provided inside the nacelle 35, for example.

The surface pressure sensor 103 measures a pressure of the blade upper surface 50a in the windmill blade main body 50 of the windmill blade 40, and is constructed by providing a plurality of semiconductor pressure sensors to the blade upper surface 50a, for example.

Note that the wind power generation system 10 can be constructed without having the surface pressure sensor 103.

The torque sensor 104 is provided in the power generator 150 and measures a torque (hereinafter, referred to as a "power generator torque" since the torque is different from a rotation torque on a windmill side) to be a load to suppress rotation of the rotary shaft (windmill blade 40).

The torque sensor 104 is not necessarily required to be one which measures a torque directly but may be one which calculates a torque by dividing a power output by an angular velocity.

The control database 120 stores data such as an elevation angle, a Reynolds number, a torque, a yaw angle, a pitch angle, and a surface pressure based on a measured value such as a wind velocity, a wind direction, a rotation speed, a surface pressure, and a power generator torque, and a plurality of control maps (curves 41, 42 of FIG. 4) with different characteristics.

In other words, the control database 120 is a storage which stores a plurality of characteristic maps indicating characteristics of torques to be generated by the power generator 150 in relation to the rotation speeds of the power generator 150.

The control database 120 is constituted with a memory, a hard disk device, and so on.

Further, to the control database 120, data input or the like is possible via a not shown keyboard, mouse, external input interface, or the like.

The controller 110 calculates an elevation angle, a Reynolds number, rotation torque on a windmill side, a yaw angle, a pitch angle, a surface pressure, and so on based on information outputted from each sensor such as a wind velocity sensor 100, a wind direction sensor 101, a rotation speed sensor 102, a surface pressure sensor 103, and a torque sensor 104, and data stored in the control database 120.

Further, the controller 110 controls the airflow generation device 60, the pitch angle drive mechanism 130, the yaw angle drive mechanism 140, the power generator 150, and the discharge power supply 63, based on results of the above-described calculation.

The controller 110 is mainly constituted with a computing device (CPU), a read-only memory (ROM), a random access memory (RAM), for example, and so on.

The CPU executes various computation processing by using a program, data and so on stored in the ROM or the RAM.

Processing executed by the controller 110 is materialized by a computer device, for example.

The controller 110 is connected to each device of the switch 111, the wind velocity sensor 100, the wind direction sensor 101, the rotation speed sensor 102, the surface pressure sensor 103, the torque sensor 104, the control database 120, the airflow generation device 60, the pitch angle drive mechanism 130, the yaw angle drive mechanism 140, the power generator 150, and the discharge power supply 63, in a manner that input/output of an electric signal is possible.

In the airflow generation device 60, as a result of ON operation of the switch 111, a voltage is applied between the first electrode 61 and the second electrode 62 from the discharge power supply 63 controlled by the controller 110 as described above, and the airflow generation device 60 comes into a operating state and generates an airflow in the direction along from the front edge to the rear edge of the blade upper surface 50a, so that a high lift force state is brought about.

Further, in the airflow generation device 60, as a result of OFF operation of the switch 111, application of the voltage between the first electrode 61 and the second electrode 62 from the discharge power supply 63 controlled by the controller 110 is halted, and the airflow generation device 60 comes into a state where driving is halted, so that the airflow in the direction along from the front edge to the rear edge of the blade upper surface 50a is not generated.

The controller 110 switches and uses the plurality of characteristic maps (curves 41, 42 of FIG. 4) of the control database 120 in accordance with drive/halt state of the airflow generation device 60, to control a power generation amount of the power generator 150.

The controller 110 controls the current-voltage characteristics or the like such as a voltage applied to the electrode, a frequency, a current waveform, and a duty ratio, for each airflow generation device 60, for example.

The pitch angle drive mechanism 130 controls an angle of the windmill blade main body 50 of the windmill blade 40 in correspondence with the rotation speed of the windmill blade 40 based on the information from the controller 110.

The yaw angle drive mechanism 140 makes the nacelle 35 turn (rotate) based on the information from the controller 110, in order to adjust a windmill rotor to the wind direction.

Figure 4:
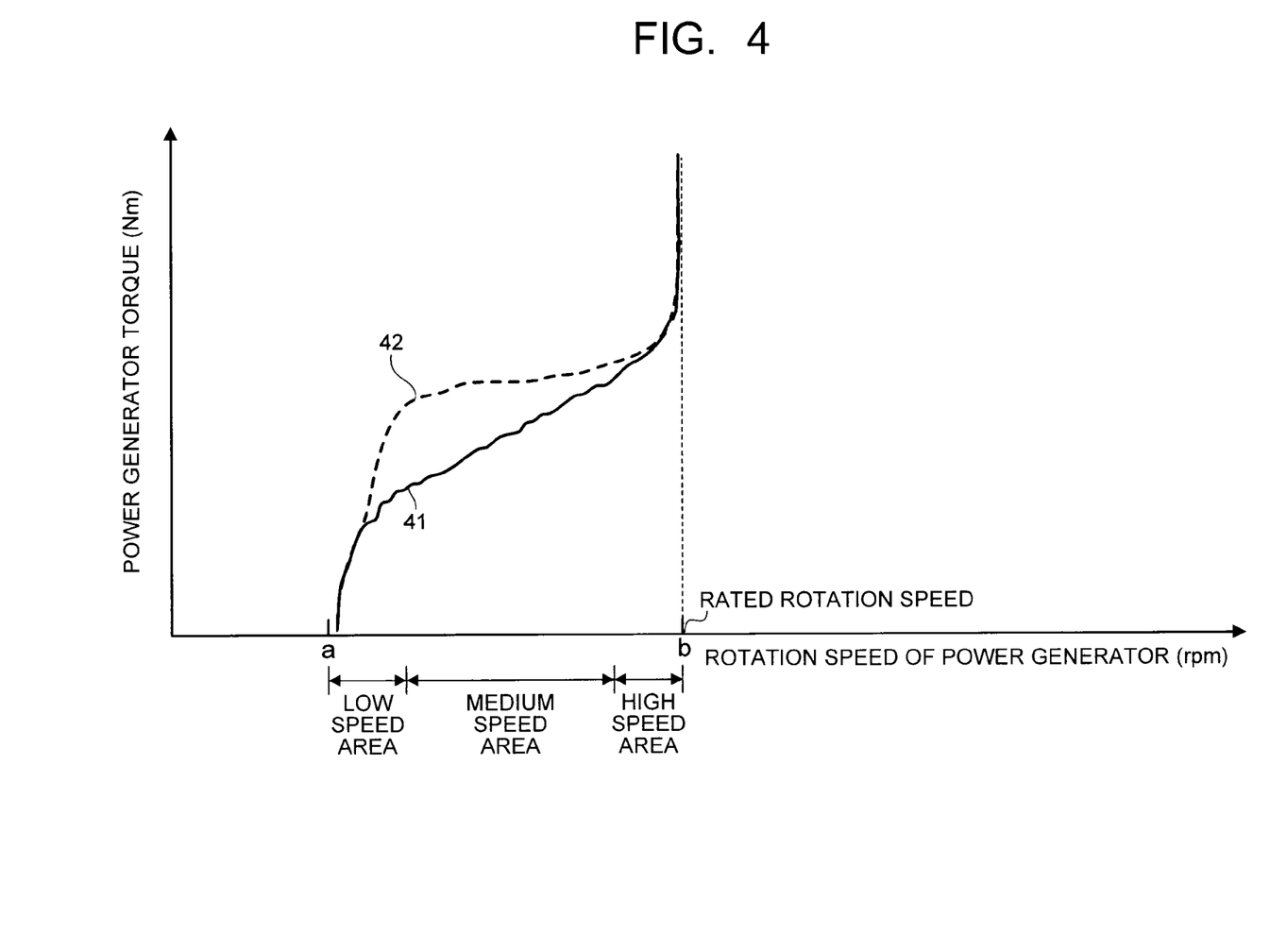
FIG. 4 is a graph showing power generator torque characteristics (control maps) of the wind power generation system of the embodiment.

Hereinafter, operation of this embodiment will be described with reference to FIG. 4. FIG. 4 is a graph showing a rotation speed-torque curve of the wind power generation system of this embodiment.

Usually, the wind power generation system is operated by a rotation speed and a power generation amount determined by the following formula (1), if friction or the like is ignored.

$$I(d\omega/dt)=TW-TM \quad \text{(formula 1)}$$

Here, "I" indicates a moment of inertia of a windmill, "ω" indicates an angular velocity of the windmill, "TW" indicates a torque of the windmill, and "TM" indicates a torque of a power generator. The windmill torque, being determined by wind and a performance of a blade, is an amount determined depending on a wind condition at that time.

Since the power generator torque relates to the power generation amount of the power generator, the power generator torque can be controlled freely by controlling the power generation amount.

For example, when no power is generated, that is, when an output terminal of the power generator is opened, the power generator torque becomes "0" (zero) in theory if friction is ignored, and the rotation speed of the windmill increases infinitely when wind blows.

In other words, if an output impedance is adjusted, that is, as a result of adjusting how much power to generate, the power generator torque TM can be controlled.

A common wind power generation system which does not have an airflow generation device 60 has a control map that changes a torque by a curve 41 as shown in FIG. 4 in correspondence with a rotation speed in advance, and controls a generation torque, that is, a power generation amount of a power generator 150.

This control map of the rotation speed-torque is usually set so that a peripheral velocity ratio of a windmill may become "5" to "7", preferably "6" so as to be able to take out wind power energy at the maximum. However, when the airflow generation device 60 works, the windmill torque TW becomes larger compared with a time when the airflow generation device 60 does not work, and thus, when a conventional rotation speed-power generator torque characteristic, that is, a control map, is used as it is, there is a problem that the rotation speed becomes large and causes deviation of the peripheral velocity ratio of the windmill from an optimum value, deteriorating an efficiency.

Thus, in the wind power generation system of this embodiment, the control database 120 has two curves 41, 42 as the plurality of control maps, as shown in FIG. 4.

The curve 41 is a curve (characteristic, function) indicating a relation between a rotation speed and a torque at a time that the airflow generation device 60 is not made to work (halt time).

The curve 42 is a curve (characteristic, function) indicating a relation between a rotation speed and a torque at a time that the airflow generation device 60 is made to work (when operating).

Reference symbols "a", "b" indicate an object range in which rotation of the power generator 150 should be controlled.

When the rotation speeds of the power generator 150 are divided into a low speed rotation area (hereinafter, referred to as a "low speed area"), a medium speed rotation area (hereinafter, referred to as a "medium speed area"), and a high speed rotation area (hereinafter, referred to as a "high speed area") in the range of the reference symbols "a", "b", in a state where the airflow generation device 60 is operated for example, the controller 110 uses the characteristic map (curve 42) with a characteristic which makes a torque of the medium speed area larger than that in a state where the airflow generation device 60 is halted.

The curve 41 for halt time is set not to generate a torque when the rotation speed is equal to or smaller than a predetermined rotation speed, and to make a torque extremely large when the rotation speed is equal to or larger than a rated rotation speed, in order to prevent the rotation speed from increasing any further to cause breakage.

In the medium speed area, the torque and the rotation speed are almost in a shape of a first-order function (linear shape) and connected to the former two.

In contrast, the curve 42 in a case where the airflow generation device 60 is made to work (when operating) is the same as the curve 41 when the rotation speed is equal to or smaller than the predetermined rotation speed and equal to or larger than the rated rotation speed, but in the medium speed area, the curve makes the torque large on a low speed area side and applies an almost constant (the same) torque even when the rotation speed changes so that the curve may gradually approach the curve 41.

The reason why the power generator torque is made larger on the low speed area side in particular is that an increase ratio of the windmill torque is larger on the low speed area side due to the airflow generation device 60, and with the curve 41 the rotation speed becomes higher compared with a case where the airflow generation device 60 is not had.

The above corresponds to a larger value of a peripheral velocity ratio than a designed value, and thus a power generation efficiency of the windmill is worsened. When the rotation speed of the windmill blade 40 becomes high, a torque increase ratio of the windmill blade 40 due to the airflow generation device 60 becomes small, the characteristic coming to be not different from the characteristic in an original case where the airflow generation device 60 is not had, and thus the curve 42 is made to gradually approach the curve 41.

Further, the airflow generation device 60 consumes some energy and may break down, and there may be cases where the device is not made to work in driving depending on a wind condition or the like.

Thus, two control maps (curves 41, 42) are set (stored in advance) as control information in the control database 120.

The controller 110 switches and uses the control maps (curves 41, 42) of the control database 120 in conjunction with driving (action switch having been ON-operated) or halting (action switch having been OFF-operated) of the airflow generation device 60, and controls the power generation amount of the power generator 150.

As described above, according to this embodiment, by switching the control maps (curves 41, 42) (also called control conditions, control information, control functions, control curves, or the like) to be used, in conjunction with driving or halting of a lift improvement device such as an airflow generation device 60, it becomes possible to drive while maintaining a peripheral velocity proportion at around "6" in both cases where the wind condition is good and the airflow generation device 60 does not need to be made to work and where the wind condition is bad and the airflow generation device 60 needs to be made to work, so that the power generation efficiency of the wind power generation system 10 can be improved and further the power generation efficiency can be maximized, and as a result, the power generation amount can be increased.

While certain embodiments have been described, these embodiments have been presented by way of example only, and are not intended to limit the scope of the inventions. Indeed, the novel embodiments described herein may be embodied in a variety of other forms; furthermore, various missions, substitutions and changes in the form of the embodiments described herein may be made without departing from the spirit of the inventions. The accompanying claims and their equivalents are intended to cover such forms or modifications as would fall within the scope and spirit of the inventions.

In the above-described embodiment, an example is described in which the airflow generation device 60 generating an airflow by action of discharge plasma is provided as the lift improvement device, but other than the above, a synthetic jet using an MEMS element may be used, for example, or a flap or the like may be used. The synthetic jet using the MEMS element, by providing a hole in a blade and driving the MEMS element disposed in the hole, is capable of jetting out and sucking air from the hole.

Figure 5:
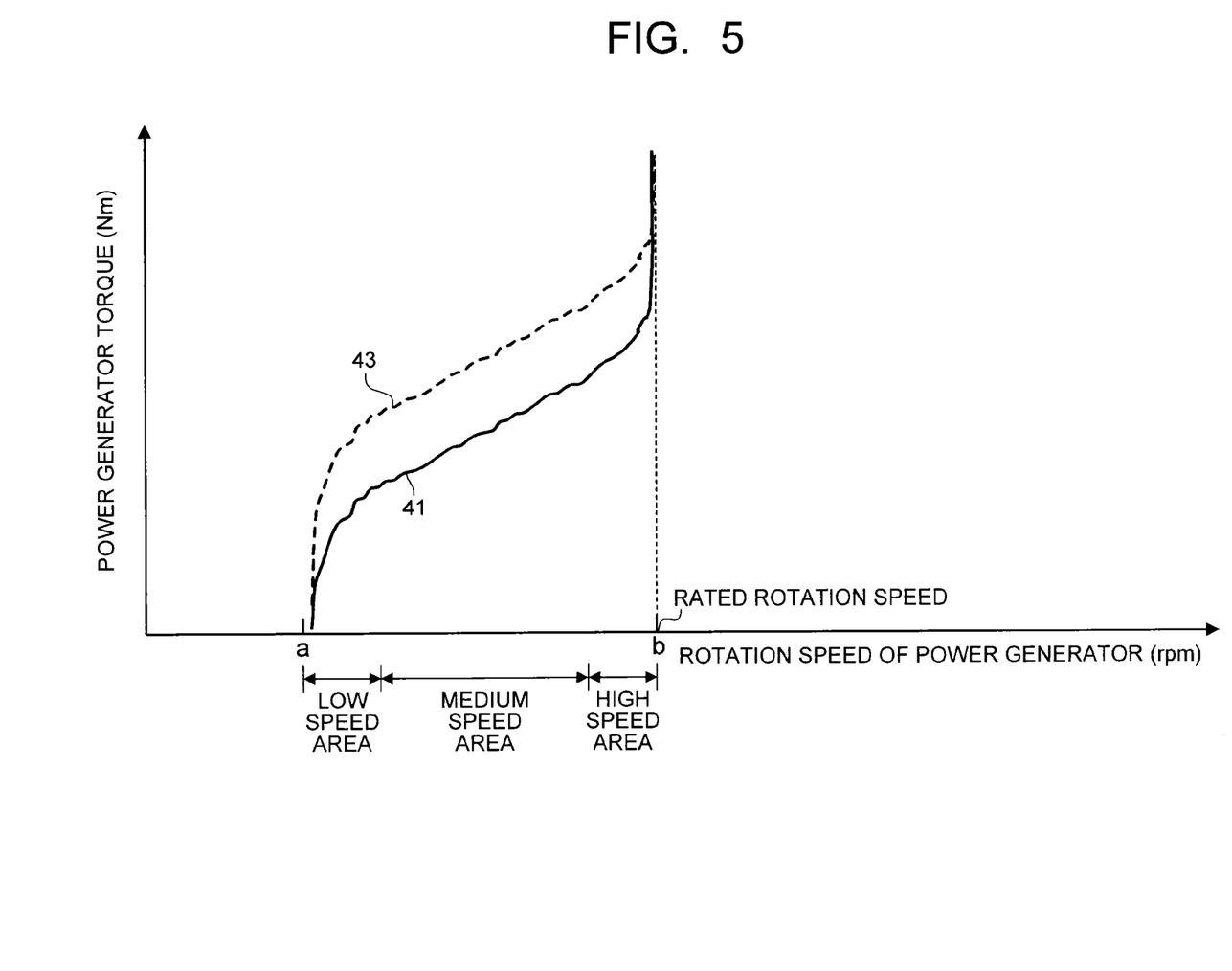
FIG. 5 is a graph showing another example of the control map.

Further, in the above-described embodiment, though the curve 42 is adopted which gradually approaches the curve 41 by applying the almost constant (the same) torque even when the rotation speed changes in the medium speed area, a curve made by moving the curve 41 at the halt time upwards in parallel as it is may be adopted as a curve 43 for drive time (characteristic map in which the power generator torque is made entirely higher than the curve 41 of the halt time), as shown in FIG. 5.

In the above embodiment, the control maps (curves 41, 42) of two different characteristics are stored in the control database 120 in advance and the controller 110 switches the two control maps (curves 41, 42) in correspondence with a drive condition, but it is possible to control, without using the control database 120, so that a correlation averaged for a predetermined period between P/ω obtained by dividing an output P of the power generator 150 by a rotation speed ω of the power generator 150 and the rotation speed ω of the power generator 150 may become different in a case where the airflow generation device 60 is halted and in a case where the airflow generation device 60 is operated, for example.

In other words, the controller 110 may control the power generation amount of the power generator 150 so that control characteristics indicating a relation between the rotation speed of the power generator 150 and the torque to be generated by the power generator 150 may become different in the case where the airflow generation device 60 is halted and in the case where the airflow generation device 60 is operated.

Further, a part of respective components of the control system indicated in the above-described embodiment may be materialized by a program installed in a storage such as a hard disk device of a computer, and the function of the present invention may be materialized by a computer by storing the above-described program in a computer-readable electronic medium and making the computer read the program from the electronic medium.

The electronic medium includes, for example, a storage medium such as a CD-ROM, a flash memory, a removable medium, and so on. Further, it is possible to materialize by storing the components dispersedly in different computers connected via a network and carrying out communication among the computers in which the respective components are made to function.

What is claimed is:

1. A wind power generation system comprising:
   a windmill configured to rotate upon a receipt of an airflow;
   a lift improvement device having an operation state and a non-operation state, the lift improvement device in the operation state increasing a lift force to the windmill;
   a power generator configured to generate power by rotation of the windmill with a torque suppressing rotation of the windmill;
   a control database comprising a storage storing at least a first control map and a second control map, the first control map indicating a relation between rotation speed and torque of the power generator when the lift improvement device is in the operation state, the second control map indicating a relation between rotation speed and torque of the power generator when the lift improvement device is in the non-operation state, the first control map being different than the second control map; and
   a controller configured to control a power generation amount of the power generator in accordance with the first control map in response to the lift improvement device being in the operation state and in accordance with the second control map in response to the lift improvement device being in the non-operation state,
   wherein the rotation speeds in the first and second control maps have a low speed rotation area, a medium speed rotation area, and a high speed rotation area, and
   wherein for any rotation speed in the medium rotation area, the torque in the medium speed rotation area of the first control map is larger than the torque in the medium speed rotation area of the second control map, when the rotation speeds in the first and second control maps are equal to each other.

2. The wind power generation system according to claim 1, wherein the torque in the low speed rotation area of the first control map is larger than the torque in the low speed rotation area of the second control map, when the rotation speeds in the first and second control maps are equal to each other.

3. The wind power generation system according to claim 1, wherein, the torque in the first control map is larger than the torque in the second control map, when the rotation speeds in the first and second control maps are equal to each other.

4. The wind power generation system according to claim 1, wherein
   the windmill includes a plurality of blades, and
   the lift improvement device is a plurality of airflow generation devices, each device being disposed at a respective blade and including a first electrode on the blade and a second electrode in the blade, the device being configured to generate a flow of plasma by applying a voltage between the first and second electrodes to increase a lift force to the blade.

5. A wind power generation method in a wind power generation system, the wind power generation system having a windmill configured to rotate upon a receipt of an airflow, a lift improvement device having an operation state and a non-operation state, the lift improvement device in the operation state increasing a lift force to the windmill, and a power generator configured to generate power by rotation of the windmill with a torque suppressing rotation of the windmill, the wind power generation method comprising:
   storing a control database comprising a first control map and a second control map, the first control map indicating a relation between rotation speed and torque of the power generator when the lift improvement device is in the operation state, the second control map indicating a relation between rotation speed and torque of the power generator when the lift improvement device is in the non-operation state, the first control map being different from the second control map; and
   controlling a power generation amount of the power generator in accordance with the first control map in response to the lift improvement device being in the operation state and in accordance with the second control map in response to the lift improvement device being in the non-operation state,
   wherein the rotation speeds in the first and second control maps have a low speed rotation area, a medium speed rotation area, and a high speed rotation area, and
   wherein for any rotation speed in the medium rotation area, the torque in the medium speed rotation area of the first control map is larger than the torque in the medium speed rotation area of the second control map, when the rotation speeds in the first and second control maps are equal to each other.

* * * * *